(No Model.)

J. J. McLAUGHLIN.
ARTIFICIAL FLOWER.

No. 593,329. Patented Nov. 9, 1897.

UNITED STATES PATENT OFFICE.

JAMES J. McLAUGHLIN, OF BOSTON, MASSACHUSETTS.

ARTIFICIAL FLOWER.

SPECIFICATION forming part of Letters Patent No. 593,329, dated November 9, 1897.

Application filed May 20, 1897. Serial No. 637,327. (No model.)

*To all whom it may concern:*

Be it known that I, JAMES J. McLAUGHLIN, a citizen of the United States, residing at Boston, in the county of Suffolk and State of Massachusetts, have invented a new and useful Improvement in Artificial Flowers, of which the following is a specification.

This invention relates to the construction and manufacture of artificial flowers; and it has for its object to construct the flower in such a manner that it will give forth an odor which is intended to be a close imitation of the natural odor of the flower. I accomplish this by providing a bulb into which powdered orris-root or some other absorptive material is placed. This bulb has a suitable neck, to and around which the petals of the imitation flower are secured. The bulb is substantially of the shape below described, and it is provided with a well, through which scented liquid may be poured and be taken up by the absorbent and into which artificial stamens may be inserted. Suitable perforations are furthermore provided, whereby the scented air may escape into the center of the flower, thus producing the effect of a real flower emitting its natural odor.

The nature of the invention is fully described in detail below and illustrated in the accompanying drawings, in which—

Figure 1:
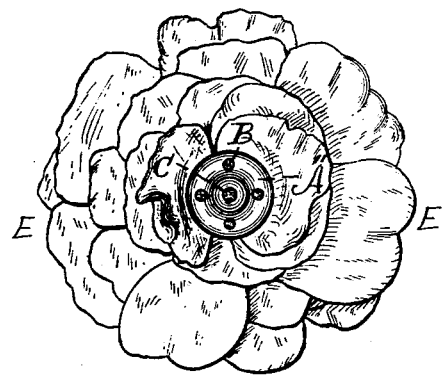
Figure 2:
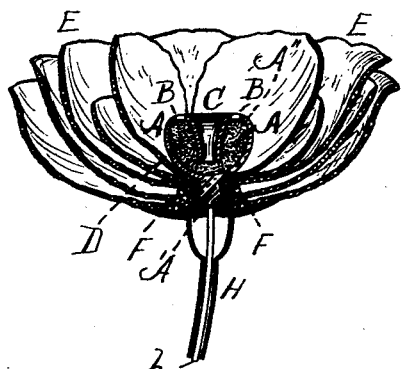

Figure 1 represents a plan or top view of an artificial flower embodying my improvement. Fig. 2 is a central vertical section of the same.

Similar letters of reference indicate corresponding parts.

A represents a hollow vessel or bulb provided with the downwardly-extending neck A', which is preferably solid and somewhat smaller and slightly grooved near the point at which it is united with the hollow portion of the bulb. The side walls of this bulb curve outwardly in a natural manner, and its top wall A'' is provided with a suitable number of perforations B. This top wall is formed downward into a central well C, which opens into the interior of the bulb. Powdered or broken orris-root or other suitable absorptive material D is inserted in the bulb through the well C.

The petals E are secured to and around the neck A' by means of a suitable wire or thread F, and a stem H and supporting-wire $h$ are attached in the ordinary manner. Liquid impregnated with a scent as nearly as possible like the natural odor of the flower is injected through the well C, preferably by means of a small syringe, and absorbed by the powdered contents D. The scented air escapes through the perforations B and renders the imitation of a natural flower more perfect.

Any style of flower may be provided or built around the bulb, which may be, if desired, somewhat modified in shape to suit the particular flower to which it is to be applied. If the flower imitated is one which nature provides with stamens, imitation stamens may be placed in the well C, thus heightening the effect.

The bulb is preferably constructed of glass, but may be of any suitable material and may be colored to match the natural color of the flower.

Having thus fully described my invention, what I claim, and desire to secure by Letters Patent, is—

In an artificial flower, the bulb or receptacle A formed with the central well C extending down into the interior of the bulb and with the perforations B; the neck A' extending down from the bulb; and artificial petals secured to said neck and extending up around the bulb, substantially as described.

JAMES J. McLAUGHLIN.

Witnesses:
 HENRY W. WILLIAMS,
 A. N. BONNEY.